United States Patent [19]

Hsien

[11] Patent Number: 5,276,305
[45] Date of Patent: Jan. 4, 1994

[54] REMOTE CONTROL SETTING DEVICE FOR ELECTRIC WELDING MACHINES

[75] Inventor: Chien-Hsing Hsien, Hsinchu, Taiwan

[73] Assignee: Industrial Technology Research Institute, Taipei, Taiwan

[21] Appl. No.: 987,701

[22] Filed: Dec. 9, 1992

[51] Int. Cl.5 ............................................. B2 K 9/10
[52] U.S. Cl. ................................................ 19/132
[58] Field of Search ...................................... 219/132

[56] References Cited

U.S. PATENT DOCUMENTS

| | | | |
|---|---|---|---|
| 2,175,891 | 10/1939 | Graham | 219/132 |
| 4,266,114 | 5/1981 | Hansen | 219/132 |
| 5,039,835 | 8/1991 | Schwiete | 219/132 |

FOREIGN PATENT DOCUMENTS 7409616  1/1975  Netherlands .................. 219/132

*Primary Examiner*—Clifford C. Shaw
*Attorney, Agent, or Firm*—Pollock, Vande Sande & Priddy

[57] ABSTRACT

A remote control device for welding machines including a control device constituted by an encoder and a decoder in the welding gun. Modulation signals generated by the decoder are directly transmitted via the welding wire to the control device, so that the control device may regulate the power output of the welding machine.

8 Claims, 3 Drawing Sheets

REMOTE CONTROL SETTING DEVICE FOR ELECTRIC WELDING MACHINES

FIELD OF THE INVENTION

The present invention relates generally to a wire remote control device for welding equipment, and particularly to a device in which the welding gun remote controls and sets the output voltage by means of the welding wire.

BACKGROUND OF THE INVENTION

The conventional welding machine is connected to a welding wire and a ground wire, and as for the wire remote control device, it is a control wire connected to the welding machine for correcting the output current or to establish another setting.

Conventional welding equipment is known to have the following drawbacks:
1. The welding wire is generally longer than the control wire; therefore, if the distance from the welding gun to the workpiece is longer than the control wire, remote control is not possible.
2. If the control wire is made longer to eliminate the above drawback, cost will be increased, and the problem of wire entanglement will be more serious.
3. Conventional control wires are easily damaged and broken or have poor contact, affecting the efficiency of the welding operation.

Apparently, the remote control device in conventional welding equipment needs to be improved.

SUMMARY OF THE INVENTION

The primary object of the present invention is to provide a remote control setting device for welding equipment, and which remote controls the welding machine by use of the welding wire.

Another object of the present invention is to provide a welding machine with a device for controlling the output voltage and having a decoder provided in the device, and a welding gun provided with an encoder for matching with the above welding machine.

The remote control device of the present invention makes use of the existing welding wire to transmit modulated signals from the welding gun to the control device in the welding machine for demodulation. After demodulation, a suitable value is set for the power output device to regulate the output voltage. Thus, the present invention eliminates the above-described drawbacks in the prior art.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
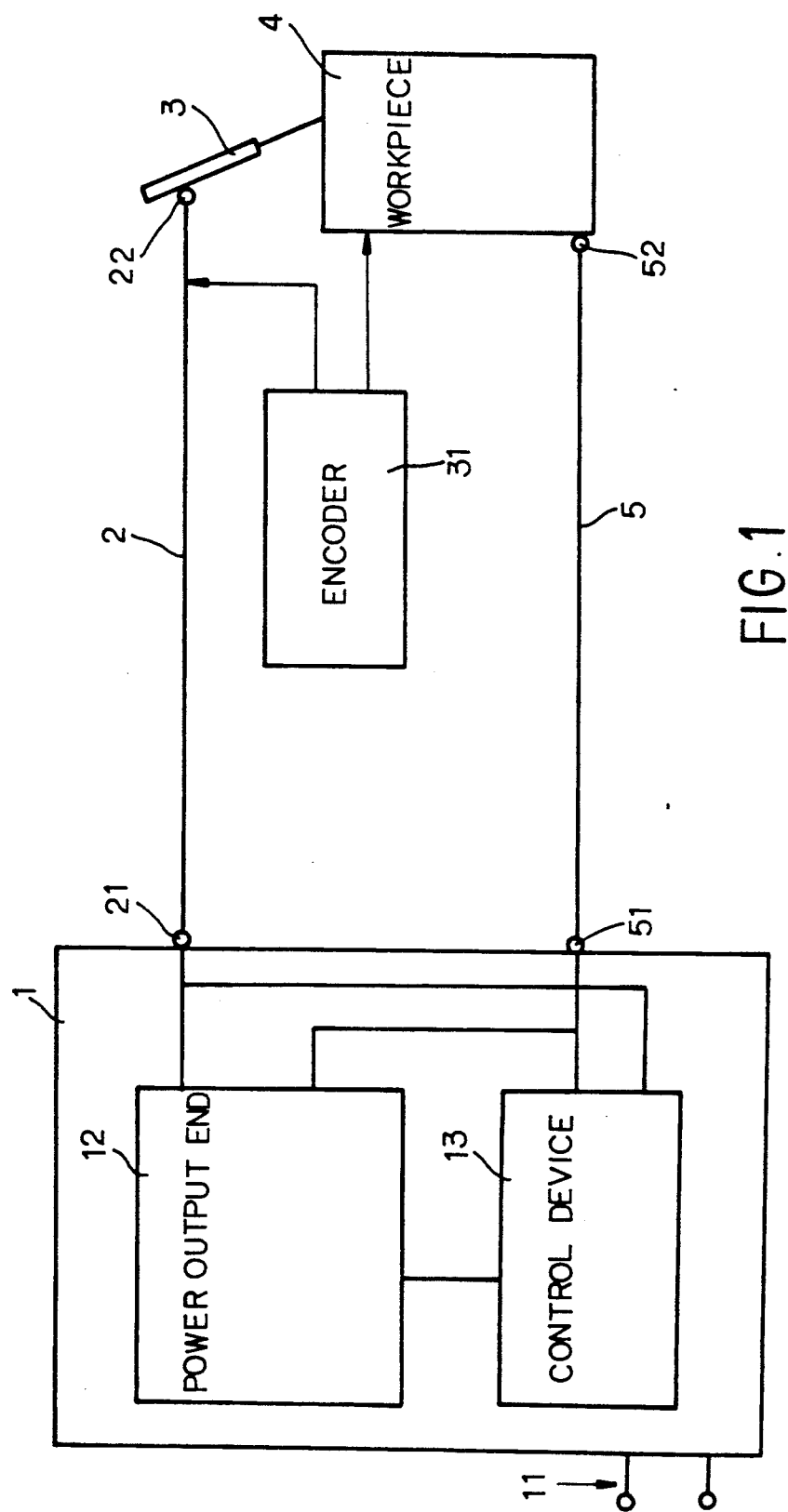
FIG. 1 is a block diagram of a preferred embodiment of the present invention.

As shown in FIG. 1, a welding machine (1) has a power input end (11), a power output end (12), and a control device (13) for controlling the voltage output by the power output device (12).

Power output device (12) is connected to a first end (21) of a welding wire (2) and a first end (51) of a ground wire (5); a second end (22) of the welding wire (2) is connected to a welding gun (3). A second end (52) of the ground wire (5) is connected to a workpiece (4). Therefore, when the welding gun (3) is in contact with the workpiece (4) (generally through electrodes), the welding machine (1), the welding wire (2), the welding gun (3), the workpiece (4), and the ground wire (5) together form a direct current loop, so that a high voltage arc is generated at the contact point of the welding gun (3) and the workpiece (4).

One of the characteristics of the present invention is that the welding gun (3) is provided with an encoder (31). The encoder (31) may be directly disposed in or attached to the gun (3) or indirectly attached to the gun (3) through electrical signals, but it should be arranged between the welding wire (2) and the workpiece (4).

Another characteristic of the present invention is that a decoder is provided in the control device (13) of the welding machine (1). The control device (13) is substantially constituted by the decoder (14), which matches with the encoder (31).

Because of the above-mentioned characteristics, the remote control of the welding machine (1) may be achieved by means of the welding wire (2), so that there is no need to provide a separate control wire.

Figure 2:
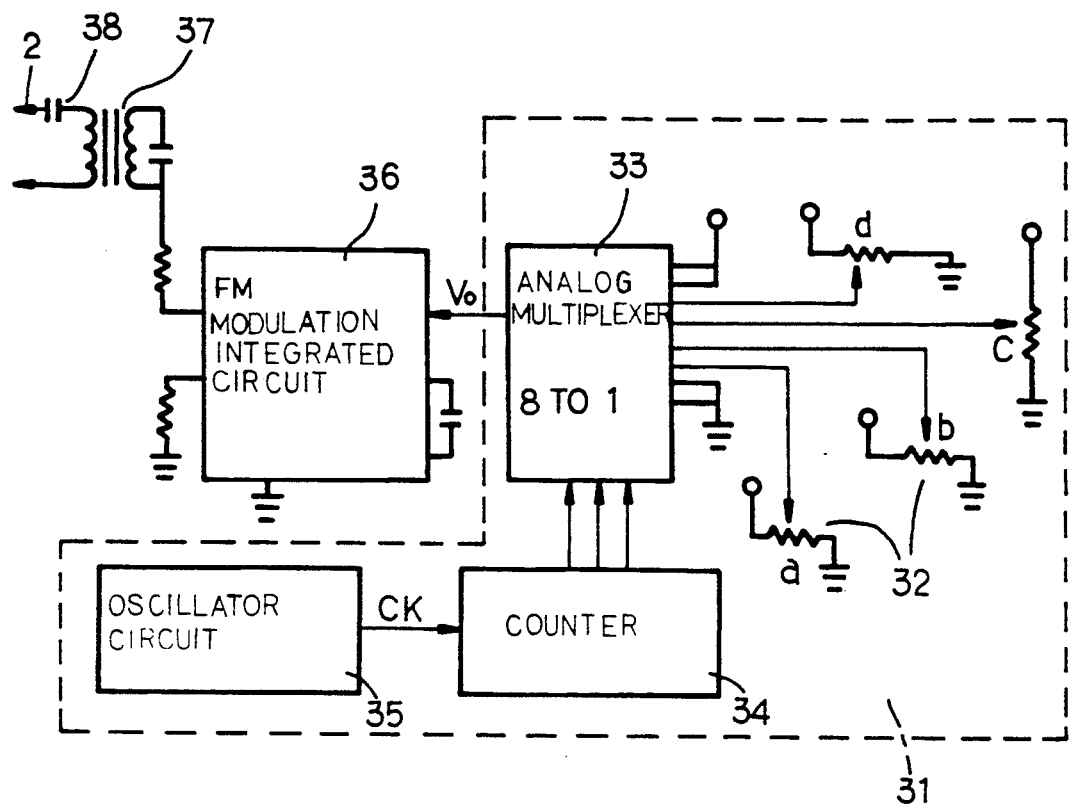
FIG. 2 is a circuit diagram of the encoder of the welding gun according to the preferred embodiment of the present invention.
Figure 3:
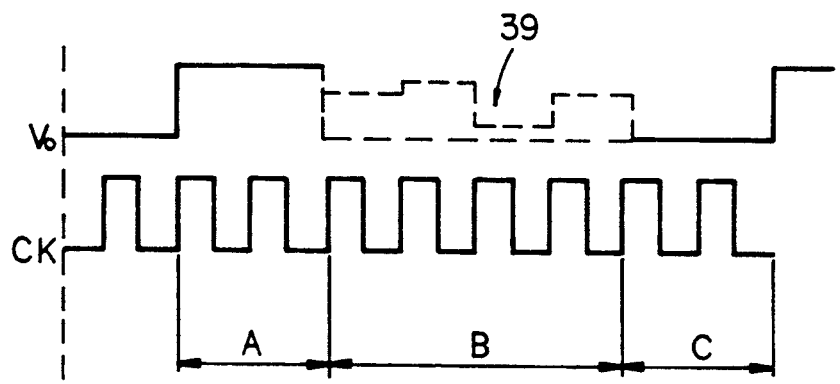
FIG. 3 is a sequence diagram of the circuit in FIG. 2.

During the welding operation, the encoder (31) (as shown in FIG. 2) of the welding gun (3) sends various setting values to the control device (13) (as shown in FIG. 1) in the welding machine (1) via the welding wire (2). The transmitted modulated signals are demodulated by means of the decoder (14) (as shown in FIG. 4), and new setting value are generated and sent to the power output device (12) in the welding machine to correct the power output to make it more suitable for smooth welding operations.

FIG. 2 shows the encoder (31), which has a number of setting resistors (32), and as shown in FIG. 2, there are four resistors, a, b, c, and d, for setting four different control parameters. These resistors are all connected to an analog multiplexer (33), which is connected to a counter (34). The counter (34) shown in the drawing adopts the octal numbering system, and the pulse frequency is 110 Hz supplied by a RC oscillator circuit (35). By means of the oscillator circuit (35), counter (34), and analog multiplexer (33), the signals are converted into a series of analog signals (39) consisting of 8 bits, in which the start bits (A) are two high voltages, followed by four different setting value voltages (B) as determined by the four setting resistors (32) mentioned above; the last two stop bits are low voltages (C).

The above-mentioned series signals are sent to the input end of a fm modulation integrated circuit (36) for modulation; the modulated signals are then sent to a high-frequency transformer (37) so that the modulated fm signals are carried into the welding wire (2). Because the welding wire (2) carries direct current, a capacitor (38) is used to separate the direct current and the output end of the fm modulation integrated circuit (36). The above-mentioned fm carrier is a high-frequency signal of about 100 KHz and a voltage range of 0-5 volts.

Figure 4:
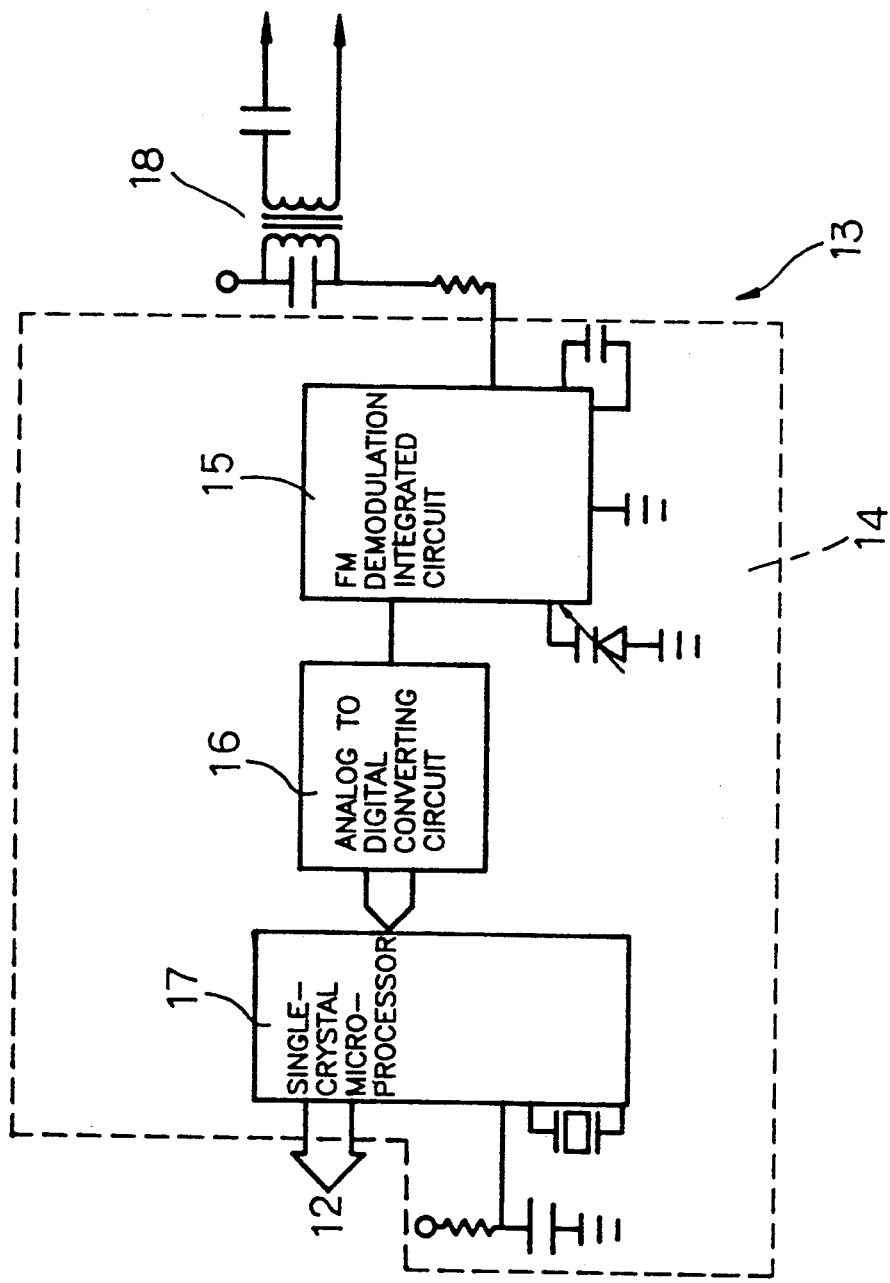
FIG. 4 is a circuit diagram of the control device in the welding machine according to the preferred embodiment of the present invention.

FIG. 4 shows the control device (13) in the welding machine (1), wherein the decoder (14) comprises a fm demodulation integrated circuit (15), which converts the signals coupled and carried by the transformer (18) into series analog signals, which are converted into digital signals via an analog converting circuit (16), the converted signals are then passed to a single-crystal microprocessor (17). Finally, the microprocessor (17) acquires the processed setting signal and sends it to the power output device (12) of the welding machine (1) as the basis for modifying the power output.

In view of the foregoing, the present invention provides a wire remote control device that does not require a separate control wire and may be directly applied to conventional welding wires to transmit signals and correct power output. Therefore, no matter how far away the work is from the welding machine, the welding operation may still be smoothly done; this feature of the present invention is not to be found in any prior art.

Although the present invention has been illustrated and described with reference to the preferred embodiments thereof, it should be understood that it is in no way limited to the details of such embodiments, but is capable of numerous modifications within the scope of the appended claims.

What is claimed is:

1. A remote control device for setting the power output of a welding machine comprising:
    a welding wire connected to one power output terminal of said welding machine;
    a ground wire connected to a second power output terminal and to a workpiece;
    a welding gun connected to said welding wire, having an encoder for generating frequency modulated signals for controlling the power output of said welding machine, comprising:
    at least one setting resistor for establishing a power level control for said welding machine;
    an oscillator for generating clock pulses;
    a counter connected to count said clock pulses;
    a multiplexer connected to receive signals from said counter and setting resistor and producing therefrom an analog information signal; and,
    a frequency modulator having an output connected to said welding wire for generating said frequency modulated signals from said analog information signals; and,
    a decoder connected to said welding wire for demodulating and decoding said frequency modulated signals and connected to said welding machine for setting said power output in response to said analog information signals.

2. A remote control setting device as claimed in claim 1, wherein said counter is a 3-bit binary counter.

3. A remote control setting device as claimed in claim 1, wherein said output end of said analog multiplexer supplies an 8-bit series analog signal, said signal including 2 start bits, 4 setting values, and 2 stop bits.

4. A remote control setting device as claimed in claim 1, wherein said decoder comprises an fm demodulator for receiving from said welding wire said frequency modulated signal; an analog/digital converter connected to said fm demodulator for receiving said information signals; and a microprocessor-connected to said analog/digital converter for generating signals for controlling said welder output power.

5. A remote control setting device as claimed in claim 4, wherein said analog/digital converter is an 8-bit analog/digital integrated circuit.

6. A remote control setting device as claimed in claim 4, wherein said microprocessor is a single-crystal 8-bit microprocessor.

7. A remote control setting device as claimed in claim 4, wherein said output end of said fm modulator is connected to a high-frequency transformer connected to said welding wire.

8. A remote control setting device as claimed in claim 4, wherein said fm demodulator is connected to a transformer connected to said welding wire.

* * * * *